Nov. 8, 1927.
J. W. WEISIGER
PRESSURE GAUGE
Original Filed Jan. 25, 1921
1,648,206
2 Sheets-Sheet 1
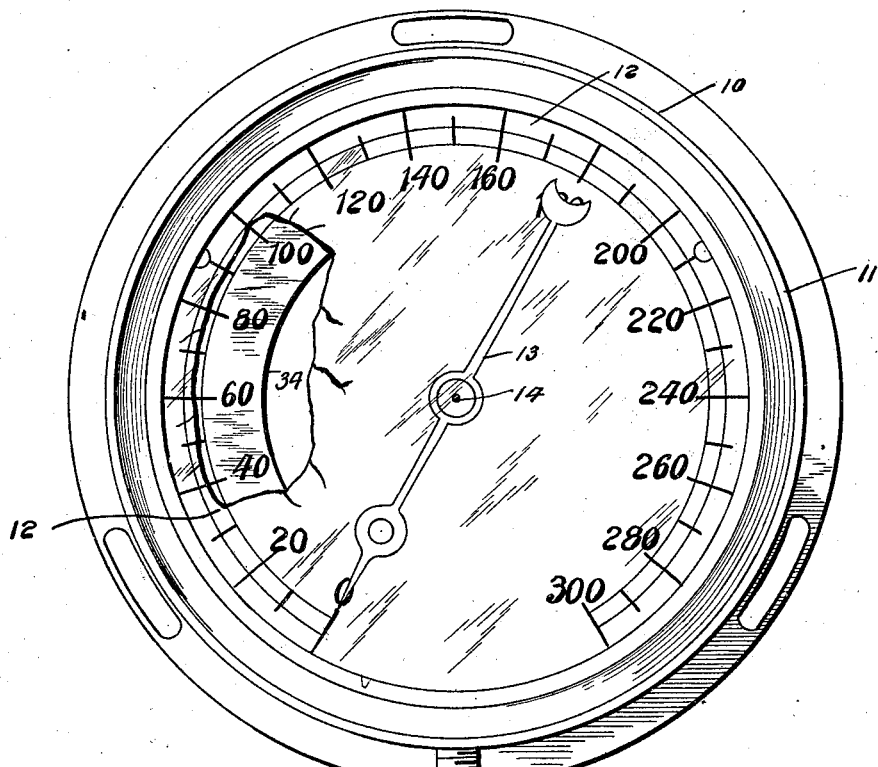
FIG. 1.
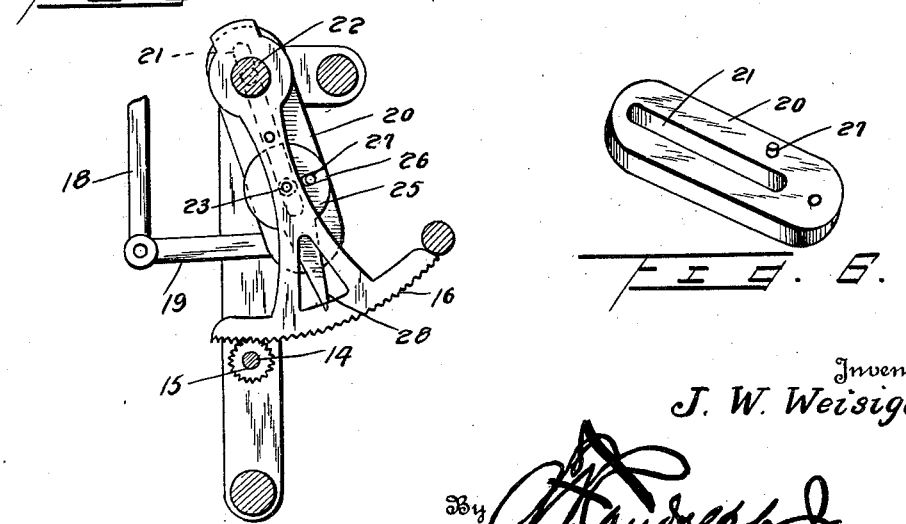
FIG. 5.
FIG. 6.
Inventor
J. W. Weisiger
By *[signature]* Attorney

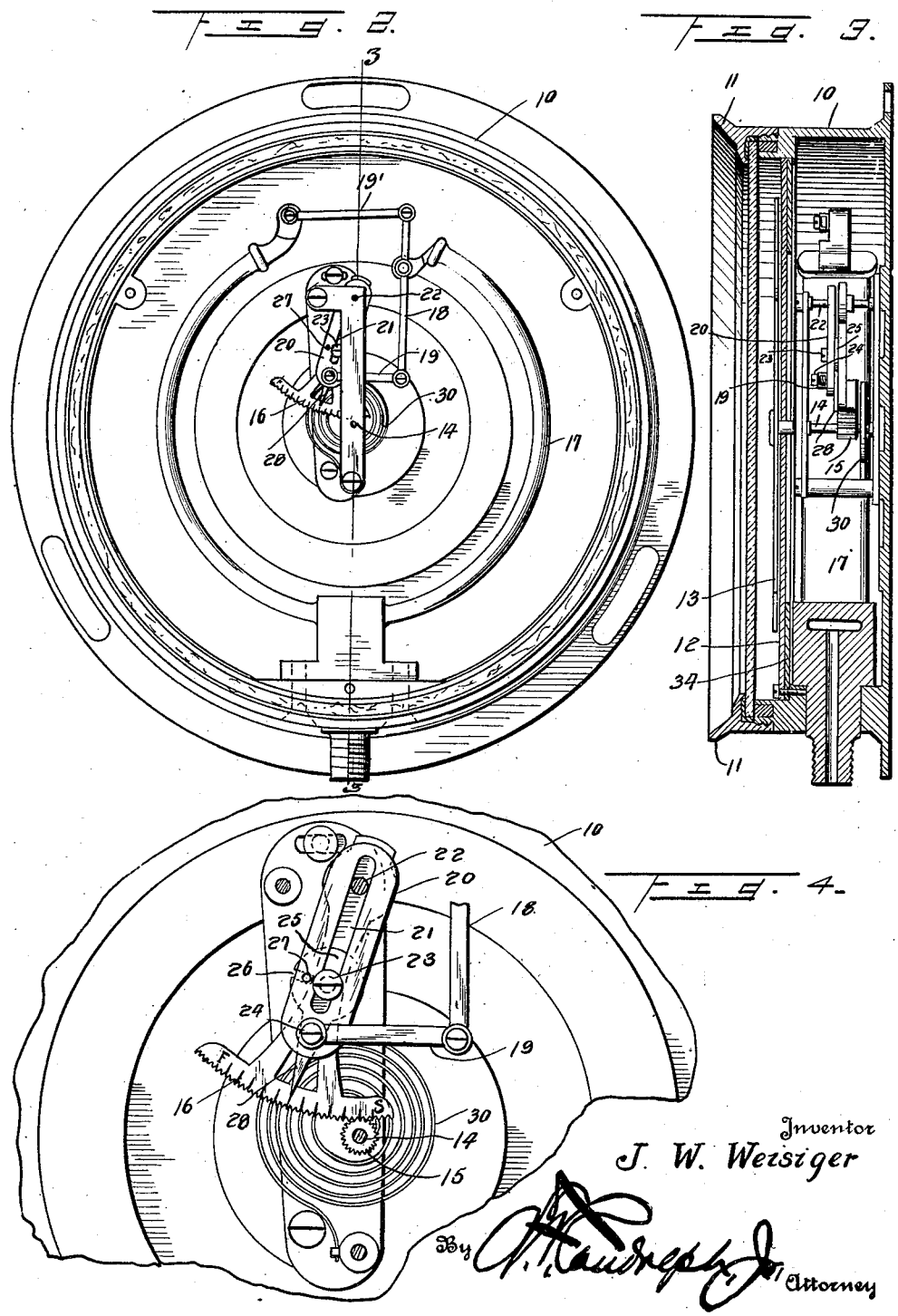

Patented Nov. 8, 1927.

1,648,206

UNITED STATES PATENT OFFICE.

JESSE W. WEISIGER, OF ROCKY MOUNT, NORTH CAROLINA, ASSIGNOR TO MANNING, MAXWELL & MOORE, INC., OF NEW YORK, N. Y., A CORPORATION OF NEW JERSEY.

PRESSURE GAUGE.

Application filed January 25, 1921, Serial No. 439,713. Renewed July 15, 1922. Serial No. 575,275.

This invention relates to measuring instruments and in its broader aspects it is applicable to a wide variety of uses, but as some of its features are more especially applicable to instruments of the indicating type, it is illustrated in such relation and more particularly it is shown in connection with an indicating pressure gauge, for which use certain of its specific features are adapted.

An object of this invention is to provide a device of the character referred to which may be economically and easily constructed and adjustable, reliable and accurate in its operation.

A further object is to provide a device of the character described in which the parts may be quickly and accurately adjusted.

A further object of the invention is to provide improved and accurate means for adjusting or correcting pressure gauges and like instruments and more especially to provide means for this purpose whereby the adjusting operation may be effected quickly and accurately without the necessity after each test adjustment of replacing the main dial in order to ascertain the results.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1 is a front view of a pressure gauge with the main dial and lens partly broken away to expose the interior.

Figure 2 is a similar view with the main dial omitted.

Figure 3 is a sectional view on the plane indicated by the line 3—3 of Figure 2.

Figure 4 is a detail view enlarged of the spindle actuating segment and slide carried thereby showing in dotted line the connection between the adjusting element and the slide.

Figure 5 is a reversed view of the slide showing in dotted lines the position of the adjusting element in operative relation therewith and Figure 6 is a detail perspective view of said slide.

In measuring instruments, comprising in general some element responsive to the external conditions to be measured, such for example as an element moving relative to a dial in response to some constant to be measured such as some condition of an electrical circuit or some condition of speed or pressure, it is desirable that means be provided for adjusting the responsiveness of the device in order that the instrument may be caused to read accurately at all times and such adjustment should be capable of being effected while the instrument is subject to normal operating conditions.

It is furthermore desirable that the effect of any adjusting action may be ascertainable while the adjustment is being made.

In many instruments provided with a scale the most ready means of access to the operating mechanism is from the side bearing the scale, by removing the latter, but it will be readily seen that to remove the scale may make it difficult to determine the result of such adjusting action readily and with accuracy.

In accordance with certain aspects of this invention, therefore, a construction is provided which permits the adjustment to be made while enabling the effect of such adjustment to be noted without the necessity of replacing and removing the scale. When applied to instruments in which it is convenient to remove a scale to facilitate the making of the adjustments this may conveniently take the form of an auxiliary device giving accurate readings of the instrument while the scale is removed.

As illustrated there is provided a casing 10, which may be fitted with a lens cap 11, and in which is placed a suitable operating mechanism, for moving a pointer or hand 13 carried on a spindle 14, over the face of a graduated dial 12. The spindle 14 is provided with a pinion 15 which is adapted to be rotated by teeth on the periphery of an actuating segment 16 as clearly shown on Fig. 4 of the drawings. The operating mechanism illustrated comprises a Bourdon tube 17 and suitable means for causing movement of the tube to move the pointer. This latter means may comprise a rocker 18 mounted pivotally at an intermediate point upon one terminal of the expansion element and connected with the other terminal of the expansion element and with a segment 16 by means respectively of the links 19′ and 19.

As convenient means for allowing of adjustment of the responsiveness of the hand to the external conditions, the link 19 may be connected with the spindle.

The link 19 however is connected with the spindle actuating segment through an intermediate slide 20 which is mounted for movement radially of the segment and is slotted as shown at 21 for the reception of the arbor 22 of the segment and a guide screw 23, the adjacent end of the link 19 being connected with the slide by means of the pivot screw 24. Mounted upon the guide screw or pin 23 is an adjusting element having an eccentric 25 fulcrumed for pivotal movement upon said pin and radially slotted as shown at 26 or engagement with a pin 27 on the slide, so that when the operating arm or index 28 also forming a part of said adjusting element is moved toward one end or the other of the spindle actuating segment, the slide is moved either toward or from the axis of said segment to vary the position radially of the pivot by which connection is made between the link 19 and the segment. The index spindle is provided with the usual hair spring 30 for returning it and therefore the index or hand carried thereby to the normal position.

The particular form of auxiliary device for giving accurate readings for the instrument during adjustment is as follows: Arranged within the casing, either temporarily or permanently in accurate correspondence so far as its graduations are concerned with the main dial is a supplemental annular test dial 34 preferably indexed exactly like the outer dial 12 and having an open center by which the spindle operating mechanism is fully exposed to permit of the proper setting of the adjusting means while said test dial is in place, and said test dial is arranged in a plane in rear of the main dial so as to be exposed when the main dial has been displaced, to the end that when it is desired to correct the instrument and the casing has been opened for that purpose by the removal of the casing cap and main dial, the pointer may be replaced upon the index spindle to traverse the test dial so that the operator in moving the adjusting means may be able to determine accurately to what extent correction is necessary and when to discontinue the movement of the said adjusting element. In the ordinary practice it is necessary in adjusting an instrument of this type to effect an adjustment believed to be approximate to that required and then replace the dial in order to ascertain whether a sufficient adjustment has been made and it is in order to avoid this loss of time and the inconvenience incident thereto that the indicated test dial has been provided for traverse by the index or pointer while the adjustment is being effected, said test dial being graduated in exact correspondence with the main dial. When the required correction has been made the hand or pointer may be removed from the spindle, the main dial and cap replaced, and the hand or pointer again secured in position with the assurance that the instrument will register accurately.

Furthermore it will be observed that the operating arm or index 28 traverses a scale on the segment 16 having indicating marks such as F and S, indicating fast and slow, as a guide to the operator in setting the mechanism, to enable him to move the pointer in the proper direction without test or experiment in the adjustment of the mechanism. This provision also serves as a time saving element of the apparatus.

It will be noted that by this arrangement each graduation of the scale upon the segment 16 will indicate a definite degree of change in the adjustment of the instrument. Hence in the adjusting of gauges of this type under standard conditions it may be possible for the tester, by noting the error of the reading of the unadjusted instrument, to make the necessary adjustment substantially at once by reference to this scale. By reason moreover, of the relation of the lever mechanism for adjusting the parts comprising, in the form illustrated, the eccentric 25, the indicator 28 may be accurately set at any point on the scale. For example, each graduation of the scale on the segment 16 will cause a definite change in the reading of the instrument under the standard conditions such that it would be a simple matter for the tester to estimate from the amount of adjustment required how much adjustment of the parts is required; while the auxiliary dial 34 enables the tester to ascertain that the zero reading as well as the reading under pressure, is correct after the adjustment.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having thus described the invention, what I claim is:—

1. A device of the class described comprising means responsive to variation in external conditions, means comprising a movable index and a normally fixed but removable element provided with graduations for indicating the response of said responsive means, means for adjusting the ratio of the movements of the responsive and indicating means, said adjusting means being normally concealed by the removable graduated element but being exposed by removal of said graduated element, and indexed means also normally concealed by said graduated element but exposed to view when the latter is removed, said indexed means cooperating with the movable index to determine the effect of adjustment of said adjusting means.

2. A device of the class described comprising a housing, an element within the housing responsive to change in external conditions, a normally fixed but removable member provided with graduations, an index movable over said graduations in accordance with the response of the responsive element, means accessible only upon removal of said graduated member for transmitting movement from the responsive element to the index and for adjusting the ratio of the movements of said responsive element and index, and a fixed indexed element, exposed when the graduated member is removed, constituting reference means for determining the degree of adjustment of the ratio adjusting means.

3. In a device of the character described, means responsive to variation in external conditions, a spindle, an index mounted thereon, a normally fixed but removable graduated dial having an opening for the passage of said spindle, the spindle being of a diameter substantially to fill said opening, means normally concealed by the dial but accessible upon removal of the dial from normal position for transmitting movement of the responsive means to the spindle and for adjusting the ratio of movement of the responsive means to the spindle, and indexed means cooperable with the movable index, after removal of the graduated dial, to determine the effect of adjustment of said adjusting means.

4. In a device of the character described, a casing open at one side, a removable graduated dial normally closing said open side of the casing, an index spindle passing through and substantially filling an opening in said dial, an index carried by the spindle, an element within the casing responsive to variation in external conditions, means normally concealed by the dial but accessible upon removal of the dial for transmitting movement from the responsive element to the spindle and for adjusting the ratio of movement of the spindle to that of the responsive element, and an indexed member constituting reference means for determining the degree of response of the responsive element after removal of the dial.

5. A device of the character described comprising in combination a plurality of parts including a Bourdon tube, a removable graduated dial, a spindle for supporting an index cooperable with the dial, means for transmitting movement from the Bourdon tube to the spindle, said transmitting means comprising relatively adjustable members, the device having a series of graduations upon one of its parts for indicating relative adjustment of said relatively movable members, means for accurately adjusting said relatively movable members with relation to each other, said last-mentioned means normally being concealed by the dial but being accessible after removal of the dial, and means for locking said relatively adjustable members in adjusted position.

6. A device of the character described comprising, in combination, a removable dial, a pressure tube, an indicator cooperable with the dial, means for transmitting movement from said pressure tube to the indicator including a gear segment, an element slidably mounted upon said gear segment, connections between said element and said tube, eccentric mechanism for sliding said element relative to the segment, actuating means associated with said eccentric mechanism, and means for indicating the degree of adjustment, said actuating means being positioned behind the dial and inaccessible when the dial is in normal position.

7. In a device of the character described, means responsive to change in external conditions, a removable member provided with graduations, an index cooperating with said removable member, means for transmitting movement from said responsive means to the index, for adjusting the ratio of movement of said responsive means to the movement of the index, and for indicating the degree of adjustment, and an auxiliary indexed element, independent of said graduated member for indicating the reading of the device during the process of adjustment, the adjusting means and said auxiliary indexed element normally being concealed by the removable graduated member.

8. A pressure gauge having an expansion element, a spindle, an index carried thereby, a removable main dial cooperating with said index, a spindle actuating segment, a radially movable slide carried by said segment to which the expansion element is connected, an adjusting element for moving said slide relatively to said segment, and an annular test dial having graduations corresponding with said main dial and normally concealed by said main dial but exposed when the latter is displaced to give access to said adjusting element.

9. A pressure gauge having an expansion element, a spindle and an actuating segment, the latter being provided with a radially movable slide to which the expansion element is connected, said segment having a scale, and a justifying element mounted upon the segment for pivotal movement and having a slot radial to its pivot engaging a pin on the slide for effecting a radial movement of the latter relatively to the segment, said adjusting element having an index for cooperation with said scale to indicate the extent of movement thereof.

10. A pressure gauge having an index spindle, an oscillatory segment for actuating the spindle, an expansion element, a rocker actuated by the expansion element, and a connection between the rocker and said segment consisting of a slide on the latter and an eccentric for moving the slide radially with relation to the segment, said eccentric carrying an adjusting pointer, and indicating means cooperative with the pointer.

11. A pressure gauge having a casing provided with a removable main graduated dial and enclosing an expansion element, a spindle, a pointer carried thereon, an oscillatory segment for actuating the spindle, connections between the expansion element and the segment, and means for adjusting the relation between said connecting means and the segment, in combination with a centrally open test dial disposed within the casing and graduated in conformity with the main dial for traverse by the pointer or index when the main dial is removed, the said adjusting means being accessible through the open center of said test dial after removal of the main dial but being normally concealed by the latter.

12. A pressure gauge having an expansion element, a spindle, and an actuating segment, the latter being provided with a radially movable slide to which the expansion element is connected, said segment having a scale thereon to guide the operator in the adjustment of the slide relatively thereto, and an adjusting element mounted upon the segment for pivotal movement and provided with a slot radial to its pivot engaging a pin on the slide for effecting a radial movement of the latter relatively to the segment, said adjusting element having an index for indicating the extent of movement thereof, said index being arranged in operative relation with said scale.

13. A device of the class described comprising an expansion element, a spindle, and a spindle actuating segment, an elongate slotted slide mounted upon the segment for adjustment radially of the latter, a stud projecting from the segment into the slot in the slide, an oscillatory adjusting member journalled on the stud, said member having a recess radial to its axis and an actuating element, and a pin projecting from the slide into said recess.

In testimony whereof I affix my signature.

JESSE W. WEISIGER.